(12) United States Patent
Sallin et al.

(10) Patent No.: US 10,509,113 B2
(45) Date of Patent: Dec. 17, 2019

(54) TECHNIQUES FOR PERFORMING TIME OF FLIGHT MEASUREMENTS

(71) Applicant: ActLight SA, Lausanne (CH)

(72) Inventors: Denis Sallin, Echandens (CH); Maxim Gureev, Lausanne (CH); Alexander Kvasov, Blonay (CH); Serguei Okhonin, St-Sulpice (CH)

(73) Assignee: ACTLIGHT SA, Lausanne (CH)

( * ) Notice: Subject to any disclaimer, the term of this patent is extended or adjusted under 35 U.S.C. 154(b) by 335 days.

(21) Appl. No.: 15/481,784

(22) Filed: Apr. 7, 2017

(65) Prior Publication Data

US 2018/0292517 A1    Oct. 11, 2018

(51) Int. Cl.
  *G01S 7/48* (2006.01)
  *G01S 7/295* (2006.01)
  *G01S 13/08* (2006.01)
  *G01S 17/10* (2006.01)

(52) U.S. Cl.
  CPC ............ *G01S 7/4865* (2013.01); *G01S 7/295* (2013.01); *G01S 7/4863* (2013.01); *G01S 13/08* (2013.01); *G01S 17/10* (2013.01)

(58) Field of Classification Search
  CPC .................................................... G01S 7/481
  See application file for complete search history.

(56) References Cited

U.S. PATENT DOCUMENTS

| | | | |
|---|---|---|---|
| 8,569,806 B2 | 10/2013 | Kim | |
| 9,012,960 B2 | 4/2015 | Okhonin | |
| 9,142,692 B2 | 9/2015 | Sheu | |
| 9,431,566 B2 | 8/2016 | Okhonin | |
| 2003/0223053 A1 | 12/2003 | Liu et al. | |
| 2010/0237455 A1 | 9/2010 | Lee | |

(Continued)

FOREIGN PATENT DOCUMENTS

| | | |
|---|---|---|
| CN | 101236995 A | 8/2008 |
| CN | 102901992 A | 1/2013 |
| JP | 2011-007622 A | 1/2011 |

OTHER PUBLICATIONS

International Search Report and Written Opinion dated Aug. 21, 2018 received in related PCT Application No. PCT/IB2018/000453 filed Apr. 5, 2018 (13 pages).

(Continued)

*Primary Examiner* — Hovhannes Baghdasaryan
(74) *Attorney, Agent, or Firm* — Wilmer Cutler Pickering Hale and Dorr LLP

(57) ABSTRACT

In some embodiments, a measurement system may include a time to digital converter (TDC) configured to determine a first digitized time at which it receives a command signal and a second digitized time at which it receives an alert signal. The first digitized time and the second digitized time may be determined for N number of iterations. The command signal may be delayed by a delay time, and the delay time may be varied for each of the N number of iterations. The measurement system may include a first dynamic photodiode (DPD) configured to switch from a reverse bias mode to an active mode based on the command signal. The TDC may calculate a difference between the first digitized time and the second digitized time for each of the N number of iterations, and the difference may vary as the delay time is varied.

20 Claims, 9 Drawing Sheets

(56) References Cited

U.S. PATENT DOCUMENTS

2013/0242314 A1* 9/2013 Fowler .................. G01S 17/42
356/601
2013/0278917 A1   10/2013 Korekado et al.
2017/0090019 A1    3/2017 Slobodyanyuk et al.
2017/0212223 A1*   7/2017 Slobodyanyuk ...... G01S 17/105

OTHER PUBLICATIONS

U.S. Appl. No. 15/461,645, filed Mar. 17, 2017.

* cited by examiner

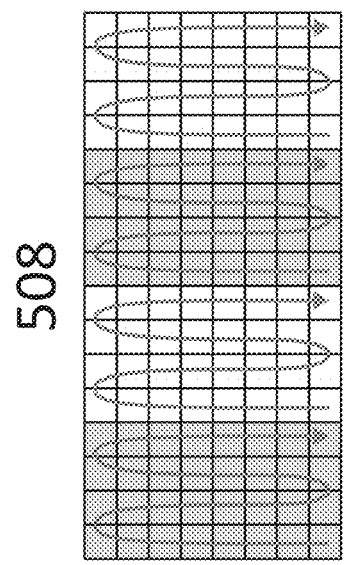
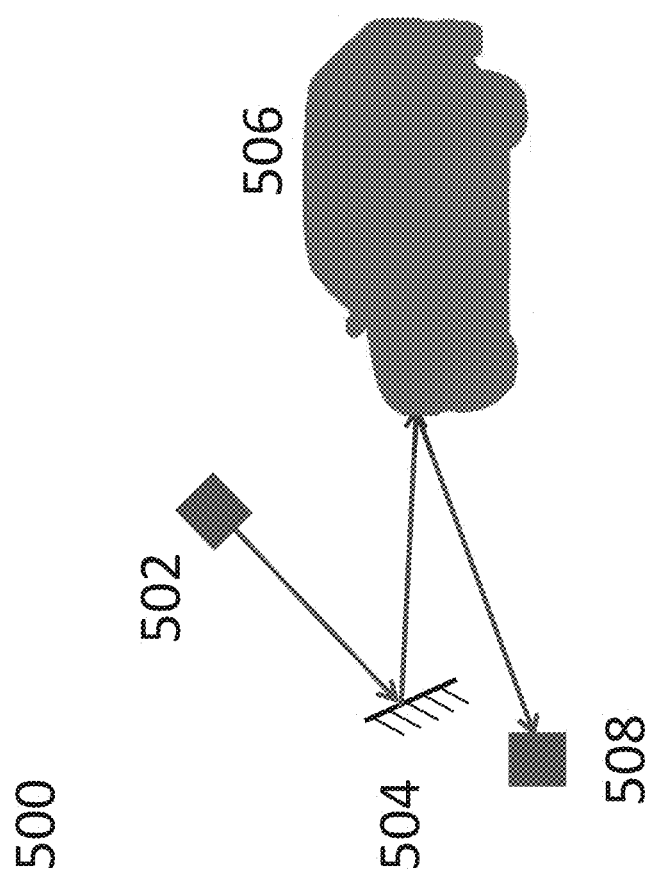
FIG. 5B
FIG. 5A

TECHNIQUES FOR PERFORMING TIME OF FLIGHT MEASUREMENTS

FIELD OF THE DISCLOSURE

This disclosure generally relates to distance measurement systems and methods, and more particularly, techniques for performing time of flight measurements.

BACKGROUND OF THE DISCLOSURE

Typical time of flight measurement systems may use time measurements derived from an output current of a sensing device to determine a distance to an object. Using output current, however, may pose a number of challenges. For example, output current may not be compatible with certain complementary metal-oxide semiconductor (CMOS) sensors, and may cause high voltages within a measurement system. Moreover, using output current may decrease measurement sensitivity to background light, and introduce noise when dealing with large pixel sizes. Additionally, such systems may utilize analog processing, which may also introduce noise into the system.

In view of the foregoing, it may be understood that there may be a need for systems and methods that improve the efficiency and performance of time of flight measurements.

SUMMARY OF THE DISCLOSURE

Techniques for performing time of flight measurements are disclosed. In some embodiments a measurement system may include a time to digital converter (TDC) that may be configured to determine a first digitized time at which it receives a command signal and a second digitized time at which it receives an alert signal. The first digitized time and the second digitized time may be determined for N number of iterations. The command signal may be delayed by a delay time. The delay time may be varied for each of the N number of iterations. The measurement system may include a first dynamic photodiode (DPD) that may be configured to switch from a reverse bias mode to an active mode based on the command signal. The first DPD may be further configured to output an output current when subjected to light in the active mode. The alert signal may be based on the output current. The TDC may calculate a difference between the first digitized time and the second digitized time for each of the N number of iterations. The difference may vary as the delay time is varied.

In some embodiments, the measurement system may further include a controller that may be configured to determine the delay time for the iteration where the difference between the first digitized time and second digitized time is minimized.

In some embodiments, the controller may determine a measurement based on the delay time for the iteration where the difference between the first digitized time and second digitized time is minimized.

In some embodiments, the measurement may be a distance measurement.

In some embodiments, the distance measurement may be determined by calculating $L=(T_{light} \cdot c)/2$, wherein L is the distance measurement, $T_{light}$ is the delay time for which the difference between the first digitized time and second digitized time is minimized, and c is speed of light.

In some embodiments, the command signal may be a multiplexed signal comprising a first command signal and a second command signal, and the first command signal may correspond to the first DPD and the second command signal may correspond to a second DPD.

In some embodiments, the command signal may be demultiplexed and the first command signal may be sent to the first DPD and the second command signal may be sent to the second DPD.

In some embodiments, the alert signal may be a multiplexed signal that includes a first alert signal and a second alert signal, wherein the first alert signal may correspond to the first DPD and the second alert signal may correspond to the second DPD.

In some embodiments, the command signal may specify a driving voltage that may be required to switch the first DPD from the reverse bias mode to the active mode.

In some embodiments, the command signal may specify a first driving voltage that may be required to switch the first DPD from the reverse bias mode to the active mode and a second driving voltage that may be required to switch a second DPD from a second reverse bias mode to a second active mode.

In some embodiments, a measurement system may include a processor and a memory storing instructions executable by the processor. The instructions may include determining a first time that may be a time from when light is emitted by a light source to when a driving voltage is applied to a dynamic photodiode (DPD). The driving voltage may forward bias the DPD. The instructions may include determining a second time that may be a time from when the driving voltage is applied to the DPD to when the DPD outputs an output current. The output current may indicate incident light that is sensed by the DPD when it is forward biased. The instructions may include determining the first time and determining the second time for N number of iterations. N may be greater than one. The first time may be varied for each iteration; The instructions may include determining a minimized second time that may be the smallest of all of the determined second times, determining the first time that corresponds to the minimized second time, and determining a distance based on the first time that may correspond to the minimized second time.

In some embodiments, the measurement may be a distance measurement.

In some embodiments, the distance measurement may be determined by calculating $L=(T_{light} \cdot c)/2$, wherein L is the distance measurement, $T_{light}$ is the first time that corresponds to the minimized second time, and c is speed of light.

In some embodiments, the first time may be varied for each iteration by increasing the first time in each iteration.

In some embodiments, the number of iterations may be a predetermined number.

In some embodiments, the instruction may include determining a first control signal that may be configured to control an oscillating mirror in a first direction.

In some embodiments, the instruction may include determining a second control signal that may be configured to control a stepper mirror in a second direction.

In some embodiments, the first control signal and the second control signal may be configured to synchronize movement of the oscillating mirror with the stepper mirror.

In some embodiments, the first direction may be a vertical direction and the second direction may be a horizontal direction.

In some embodiments, the first direction may be a horizontal direction and the second direction may be a vertical direction.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 5A shows an overview of an implementation of a time of flight system according to an embodiment of the present disclosure.

FIG. 5B shows an exemplary scanning pattern for a light source according to an embodiment of the present disclosure.

DETAILED DESCRIPTION

Figure 1A:
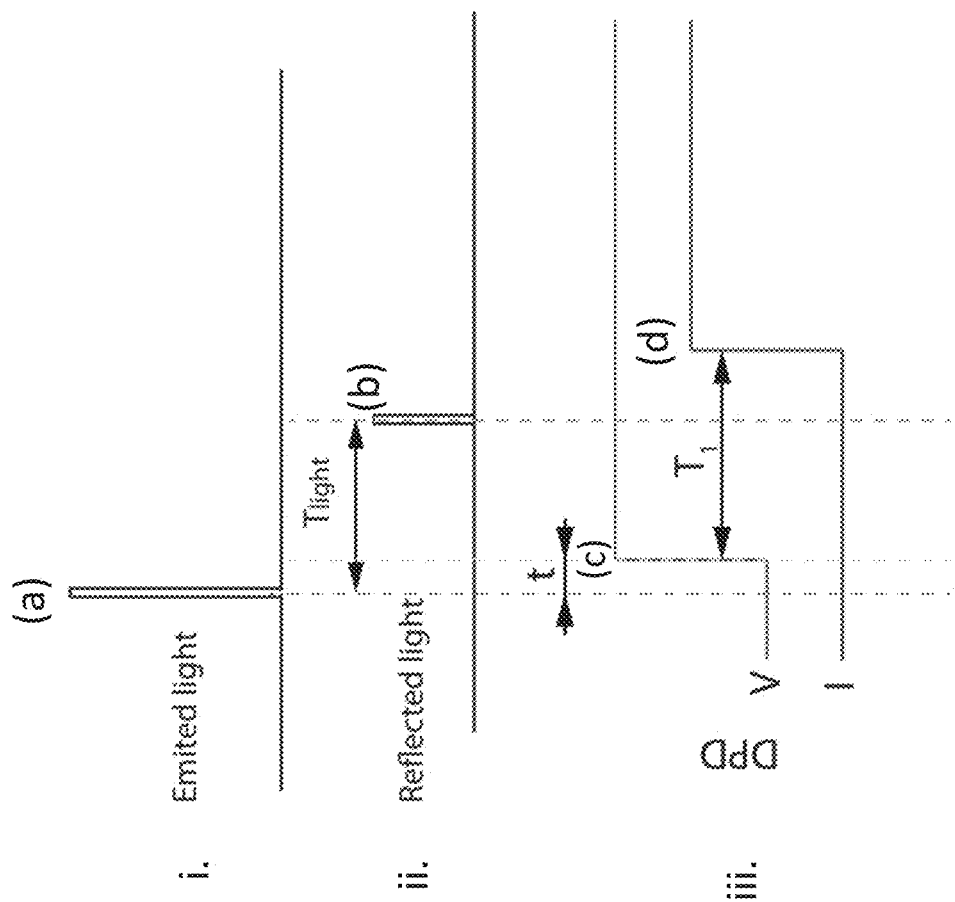
FIG. 1A shows graphs of dynamic photodiode (DPD) performance.

FIG. 1A shows graphs that are representative of dynamic photodiode (DPD) performance according to an embodiment of the present disclosure. In particular, FIG. 1A shows the relation between light emitted from light source such as a laser, reflected light caused by the emitted light reflecting from one or more objects in an environment, and the response of a DPD sensing light reflected from the one or more objects in the environment in accordance with an embodiment of the present disclosure. First, with reference to graph (i) of FIG. 1A, a light source may deliver a pulse of emitted light, as represented by light source pulse (a). The light source may be a laser light source, or any light source capable of emitting light pulses. The pulse of emitted light may be emitted into an environment, and interact with one or more objects in the environment. After the emitted light interacts with one or more objects in the environment, reflected light from the one or more objects may be emitted.

With reference to graph (ii), reflected light may be reflected from the one or more objects and incident on a light sensing region of a DPD, as reflected by pulse (b). The difference in time from pulse (a) to pulse (b) is $T_{light}$, and represents the delay between the time when light is emitted by the light source and the time when light is incident on a light sensing region of the DPD.

With reference to graph (iii), DPD performance from light source emitting (graph (i), pulse (a)) through reflected light incidence (graph (ii), pulse (b)), and thereafter is shown. In particular, a driving voltage V and output current I of the DPD sensing reflected light are shown. The driving voltage V may be the voltage difference between anode and cathode of the DPD. The output current I may be the current measured as being output from one of the anode or cathode of the DPD. Initially, both V and I may be zero. This initial level of V and I may be because the DPD is reverse biased and may not have the driving voltage V applied to it. Therefore, in this state, the DPD may not sense incident light and output current I may be zero. As shown by graph (iii), after a time (t) from when light is emitted by a light source (e.g., after a time (t) from pulse (a) of graph (i)), the driving voltage V may be put into a high state, as indicated by point (c) on graph (iii). The high state may be a driving voltage that places the DPD into a forward biased, active mode. The DPD may now sense light that is incident on its light sensing region. The DPD may be placed into the active mode before a time when reflected light is incident on the light sensing region of the DPD (e.g., before pulse (b)), or at least at a time when the DPD is capable of detecting reflected light incident on the light sensing region of the DPD (e.g., at a time when it is capable of detecting the event at pulse (b)). After a triggering time $(T_1)$ from when driving voltage V places the DPD in active mode (e.g., point (c)), the DPD may output the output current I at point (d) indicating an amount of reflected light from the one or more objects sensed by the DPD.

When the DPD is used to capture reflected light from the one or more objects, the process described in FIG. 1A may be iterated a number of times, with the time (t) varied for each iteration. This variation of (t) may thereby vary the delay from when light is emitted by a light source (e.g., pulse (a) of graph (i)) to when the voltage of the DPD is in an active state, as indicated by point (c) on graph (iii). The triggering time $T_1$ may be recorded for each iteration of time (t). After performing the number of iterations, the time (t) for which $T_1$ is minimized and the DPD is still forward biased and able to sense the event at pulse (b) corresponds to Lot. $T_{light}$ may be determined and used in further calculations.

For example, $T_{light}$ can be used to determine the distance L between the one or more objects in the environment and the DPD using the following equation:

$$L=(T_{light} \cdot c)/2$$

where L is the distance between the one or more objects in the environment and the DPD, $T_{light}$ is as described above, and c is the speed of light. The DPD performance shown in FIG. 1A therefore uses the triggering time $T_1$ to determine the distance L. This is advantageous because it provides a time domain measurement. In embodiments of the present disclosure, this calculation may be performed in systems that do not use analog amplification, and may use time to digital conversion (TDC) rather than analog to digital conversion (ADC). Therefore, there may be no or a reduced amount of added noise due to analog processes in the calculation, and a reduced amount of mismatch and background light interference. TDC constraints may also not be as stringent relative to other conversion techniques.

Figure 1B:
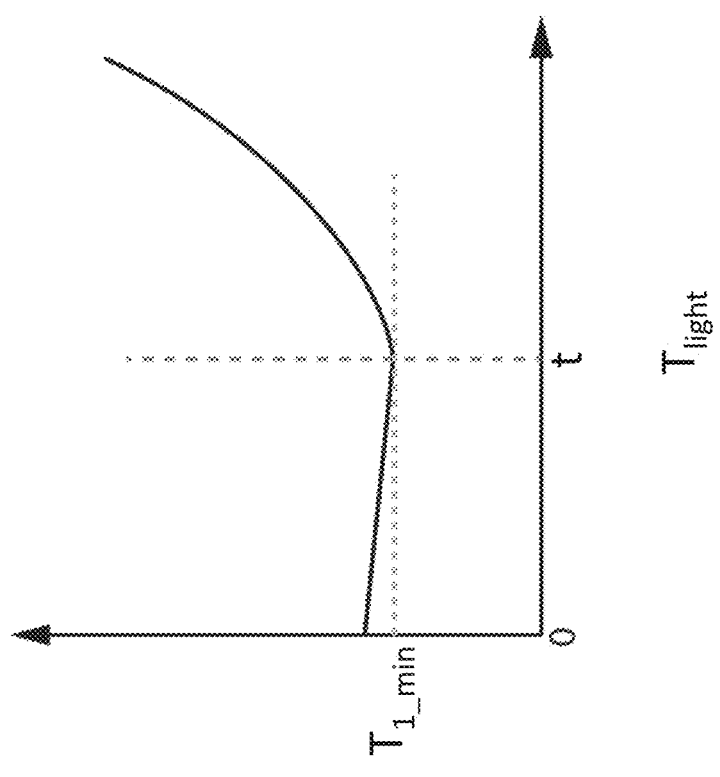
FIG. 1B shows a graph of the triggering time versus the delay time.

FIG. 1B shows a theoretical graph of the triggering time $T_1$ versus the delay time $T_{light}$. As shown by FIG. 1B, as the delay between the time when light is emitted by the light source and the time when light is incident on the DPD increases (e.g., as $T_{light}$ is increased) to the time (t), the triggering time $T_1$ may decrease to a minimum value $T_{1\_min}$. As $T_{light}$ continues increasing past time (t), however, triggering time $T_1$ may increase. The significance of FIG. 1B is that it shows that when the triggering time $T_1$ is minimum, $T_{light}$ equals the time (t). Therefore, the time (t) and triggering time $T_1$ may be used to determine $T_{light}$, and $T_{light}$ can be used to determine the distance L as previously discussed.

Figure 1C:
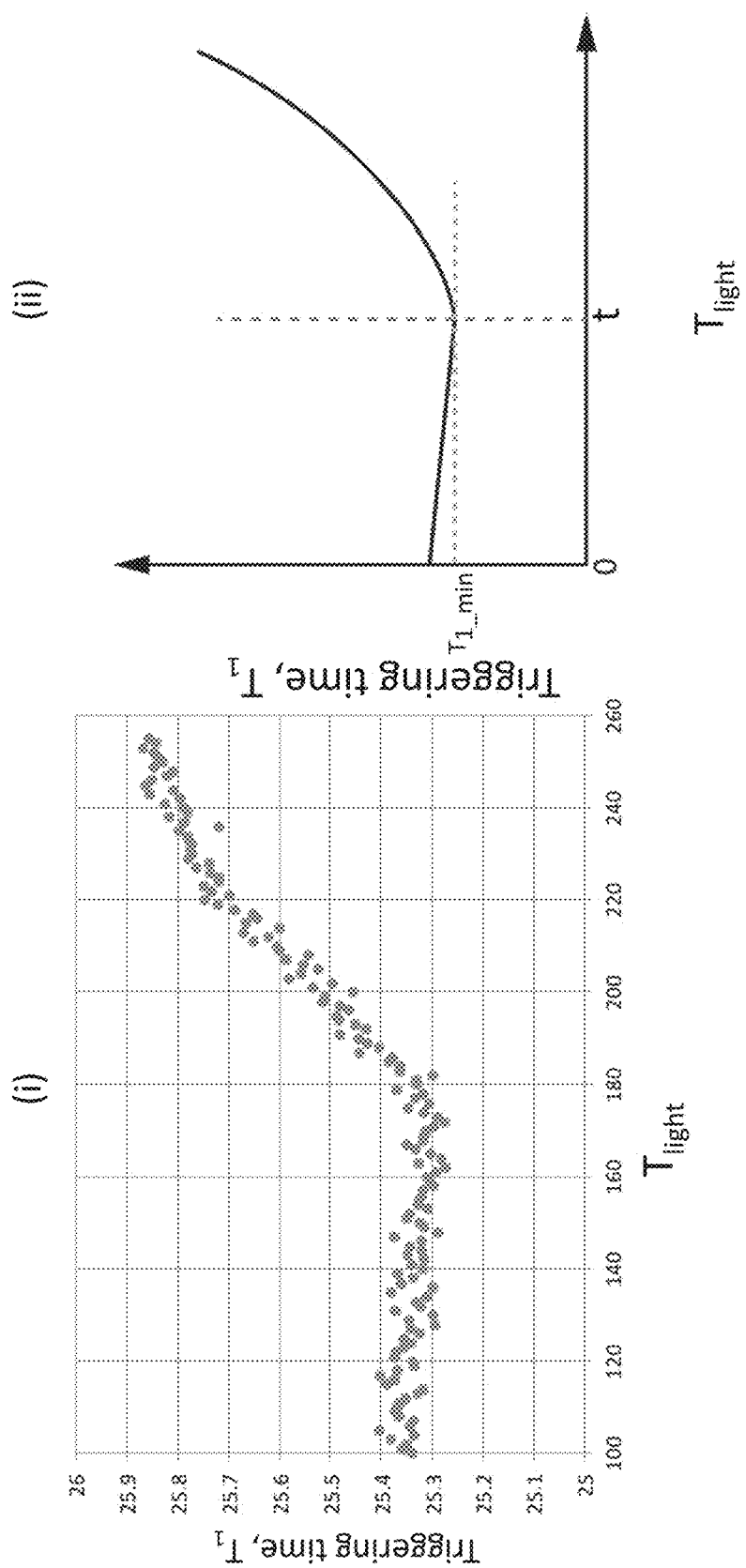
FIG. 1C shows a comparison between theoretical and measured curves of triggering time versus delay time.

FIG. 1C shows a comparison between theoretical and measured curves of triggering time $T_1$ versus $T_{light}$. The measured curve is identified as curve (i). The theoretical curve is identified as curve (ii). As shown by FIG. 1C, the measured and theoretical curves correspond to each other, and closely resemble each other. The concave nature of the curves may be caused by weak reflected signals that are incident on a DPD. When weak reflected signals are present, $T_1$ may become close to a self-triggering time, which is a triggering time when no reflected signal is present, and which forms an upper boundary to triggering time measurements. Weak reflected signals may additionally explain the noise associated with curve (i).

Figure 2:
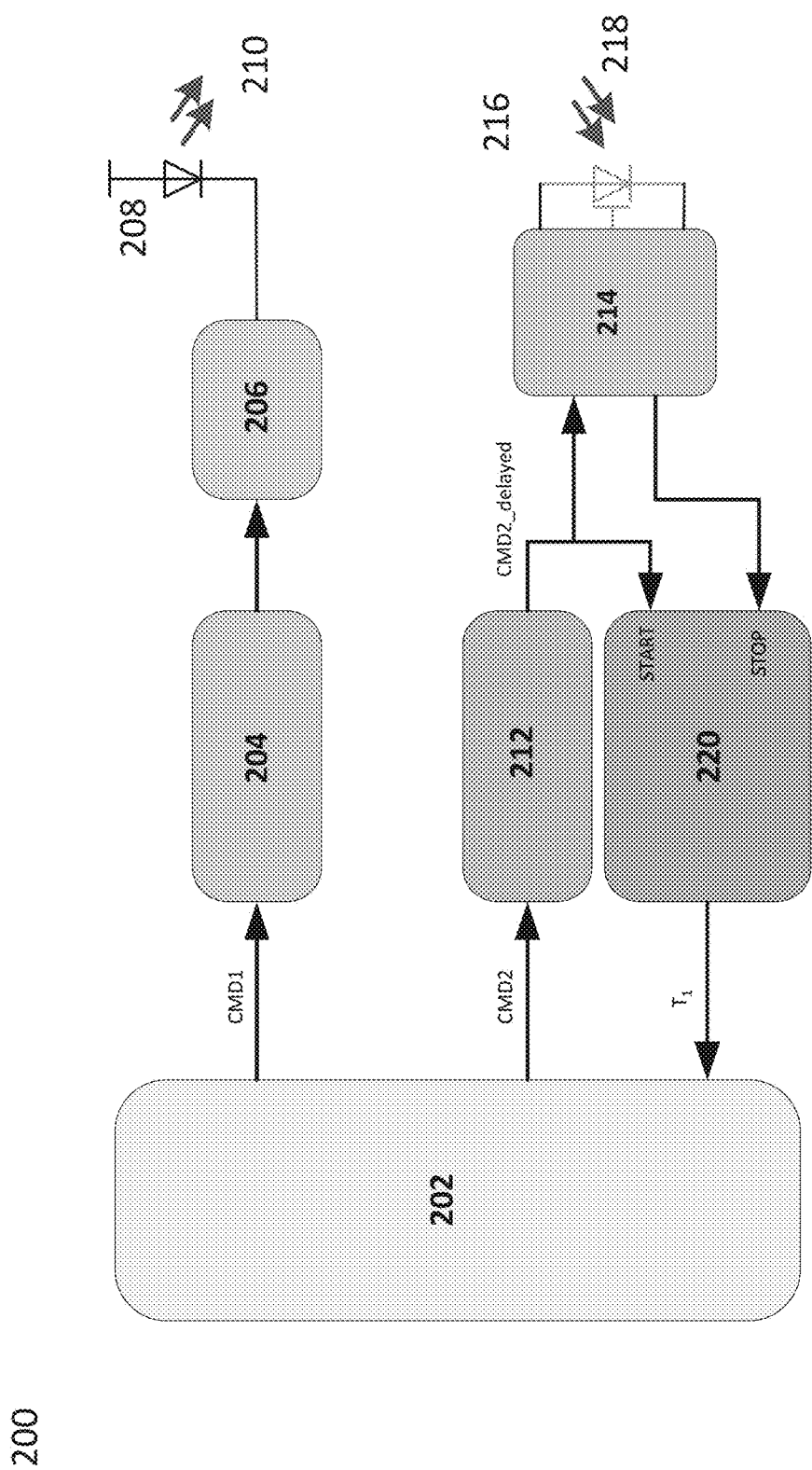
FIG. 2 shows a time of flight system according to an embodiment of the present disclosure where a single DPD is included.

FIG. 2 shows a time of flight system 200 according to an embodiment of the present disclosure where a single DPD is included. System 200 includes a controller 202. Controller 202 may be formed by one or more microcontrollers, processors, or microprocessors. Controller 202 may include one or more memory devices such as dynamic random access memory (DRAM), static random access memory (SRAM), flash memory, a magnetic disk drive, an optical drive, a programmable read only memory (PROM), a read only memory (ROM), or any other memory and combination of memories. The one or more microcontrollers, processors, or microprocessors may implement algorithms, instructions, and/or programs that are stored on the one or more of the memory devices in order to perform the various processes of the present disclosure. Controller 202 may send and receive various signals from components in system 200. Moreover, while FIG. 2 (as well as FIGS. 3 and 4) show various components, it should be understood that the functionality of such components may be embodied in one or more processors that execute instructions which provide such functionality and are stored in one or more memory devices.

As shown in FIG. 2, controller 202 may send a command signal CMD1 to pulse generator 204. Command signal CMD1 may specify information about how light should be emitted by a light source 208 in system 200. For example, CMD1 may specify the pulse width and/or pulse magnitude of light emitted by light source 208. CMD1 may specify the pulse width and/or pulse magnitude of light for a plurality of pulses or for a single pulse.

Pulse generator 204 may receive CMD1 from controller 202 and may determine the kind of light pulse that should be emitted by light source 208. For example, pulse generator 204 may determine the pulse width and/or pulse magnitude from CMD1. Based on this determination, pulse generator 204 may send light pulse parameters to driver 206. Driver 206 may then drive light source 208 to output a pulse 210. Pulse 210 may be output and may reflect off of one or more objects in an environment to generate incident light 218.

Light source 208 may be a laser that emits an infrared (IR) light pulse. Alternatively, light source 208 may be a light source device that emits light other than IR light pulses. For example, light source 208 may be a laser device that emits light pulses featuring wavelengths from parts of the light spectrum other than the infrared wavelength range. Light source 208 may be a light source that is capable of generating short, medium, and long pulses of light. Light source 208 may emit visible or non-visible light.

At the same time or substantially the same time that CMD1 is sent to pulse generator 204 by controller 202, command signal CMD2 may be sent from controller 202 to programmable delay generator 212. CMD2 may specify when the driving voltage V (referred to above in regard to FIG. 1) should be provided to DPD 216. Therefore, CMD2 may specify when DPD 216 should be changed from reverse bias to forward bias and placed in active mode to sense incident light 218. CMD2 may additionally specify the voltage amount to be provided to DPD 216 in order to place it into the active mode. DPD 216 may be a dynamic photodiode as described in U.S. patent application Ser. Nos. 15/461,645 and 14/689,276 (U.S. Pat. No. 9,431,566), which are each expressly incorporated herein by reference.

Programmable delay generator 212 may receive CMD2 and determine the amount of time (t) after light is emitted from light source 208 to delay forwarding CMD2 to sensor front end 214. Programmable delay generator 212 may output a delayed CMD2 (e.g., CMD2_delayed) to sensor front end 214. Programmable delay generator 212 may also output CMD2_delayed to time to digital converter (TDC) 220.

Sensor front end 214 may receive CMD2_delayed and may provide driving voltage V to DPD 216. DPD 216 may then be forward biased and placed into active mode. DPD 216 may sense incident light 218 and output the current I, as discussed above with reference to FIG. 1A. The current I may be output to sensor front end 214. Sensor front end 214 may send a digitized alert signal to TDC 220 indicating that current I has been output to sensor front end 214.

TDC 220 may measure the time at which it receives CMD2_delayed, and treat this time as the time when driving voltage V is provided to DPD 216, placing DPD 216 into an active state (i.e., point (c) of FIG. 1A). TDC 220 may also measure the time at which it receives the alert signal from sensor front end 214 (i.e., point (d) of FIG. 1A). TDC 220 may record digital representations of the measured times. TDC 220 may determine the triggering time $T_1$ by calculating the difference between these two measured times. This calculation may utilize the digital representations of the measured times.

Programmable delay generator 212 may vary the amount of time (t) to delay CMD2, and provide different times (t) to sensor front end 214 for a number of iterations. The number of iterations may be a predetermined number, or a variably calculated number. For each iteration, the triggering time $T_1$ may be determined by TDC 220. Each triggering time $T_1$ may be output to controller 202 and recorded by controller 202. Controller 202 may determine the time (t) for which the triggering time $T_1$ is minimized with the DPD still forward biased and able to sense the event at pulse (b) in FIG. 1A. This time (t) where $T_1$ is minimized equals $T_{light}$. $T_{light}$ may then be used by controller 202 to determine the distance L between the one or more objects in the environment and the DPD 216 using the following equation discussed above:

$$L = (T_{light} \cdot c)/2$$

where L is the distance between the one or more objects in the environment and the DPD 216, $T_{light}$ is as described above, and c is the speed of light.

Figure 3:
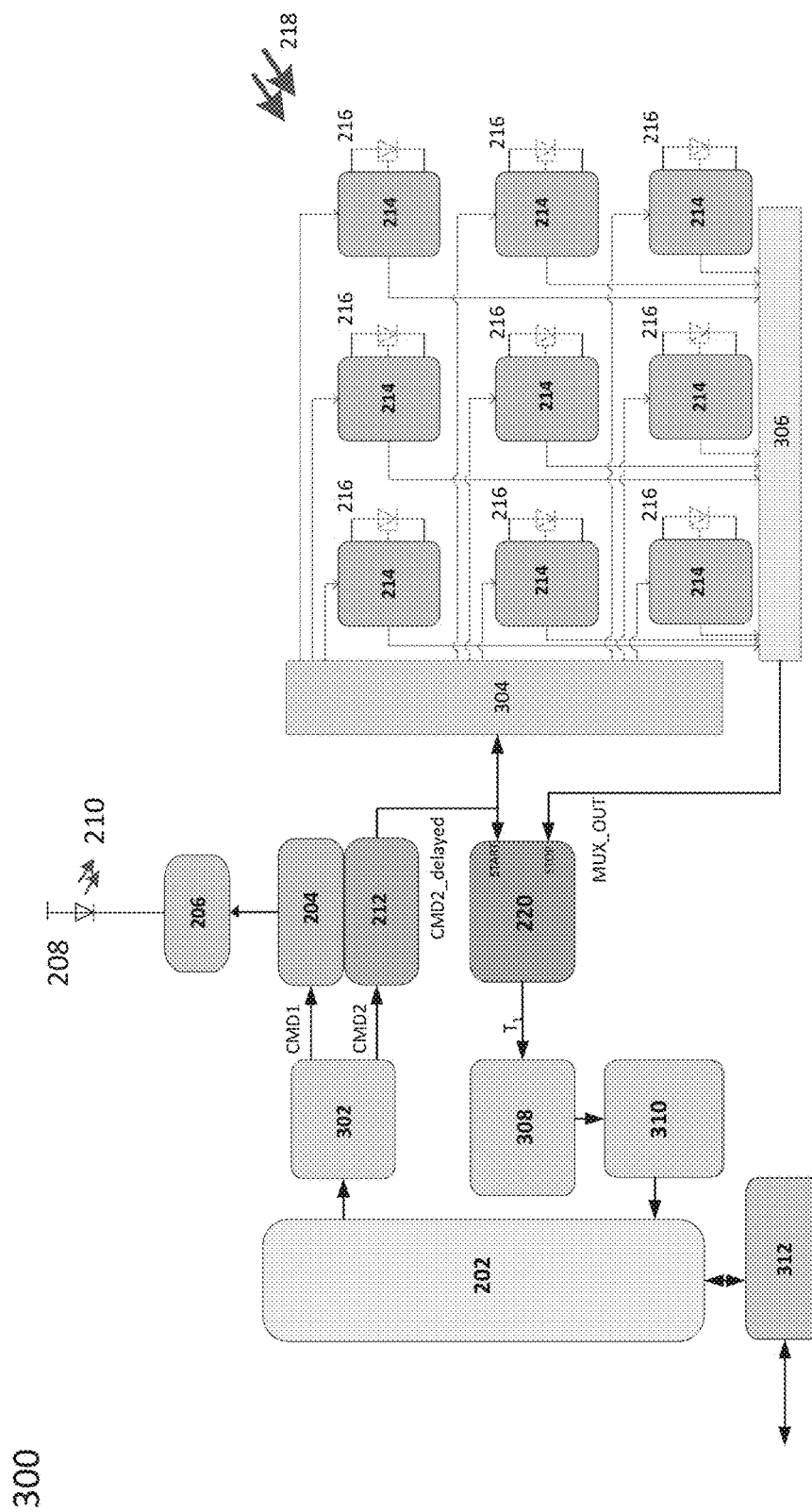
FIG. 3 shows a time of flight system according to an embodiment of the present disclosure where multiple DPDs are included and a multiplexing/de-multiplexing operation is used.

FIG. 3 shows a time of flight system 300 according to an embodiment of the present disclosure where multiple DPDs are included and multiplexing/de-multiplexing may be utilized. Elements referred to by the same reference numerals as in FIG. 2 function as described in regard to FIG. 2.

Signal generator 302 may receive a command from controller 202 to drive light source 208 and activate one or more of DPDs 216. Signal generator 302 may generate command signal CMD1. For example, CMD1 may be as previously described above. CMD1 may be sent to pulse generator 204, which may determine the kind of light pulse that should be emitted by light source 208. Based on this determination, pulse generator 204 may send light pulse parameters to driver 206 and driver 206 may drive light source 208 to output a pulse 210 as previously described. Pulse 210 may be output and reflect off of one or more objects in an environment to generate incident light 218.

Signal generator 302 may also generate command signal CMD2. CMD2 may be a combined command signal that includes N number of command signals for N number of DPDs 216, where N ranges from 1 to as many DPDs 216 that are utilized. For example, CMD2 may be a multiplexed signal that includes N number of command signals for N number of DPDs 216. Each of the N command signals of CMD2 may specify when a driving voltage V should be provided to each of the N number of DPD 216s. Each of the N command signals of CMD2 may specify when each DPD 216 should be changed from reverse bias to forward bias and placed in active mode to sense incident light 218.

At the same time or substantially the same time that CMD1 is sent to pulse generator 204 by signal generator 302, command signal CMD2 may be sent from signal generator 302 to programmable delay generator 212. Programmable delay generator 212 may receive CMD2 and determine the amount of time (t) after light is emitted from light source 208 to delay forwarding CMD2 to sensor front end 214. Programmable delay generator 212 may delay CMD2 by time (t) and output a delayed CMD2 (e.g., CMD2_delayed) to demultiplexor (DMUX) 304.

Programmable delay generator 212 may also output CMD2_delayed to time to digital converter (TDC) 220.

DMUX 304 may demultiplex CMD2_delayed to extract each of the N command signals contained within it. Each of the N command signals may then be sent to a respective sensor front end 214. In some embodiments, a command signal may be sent to each of the sensor front ends 214 in system 300. In some embodiments, a command signal may be sent to only each of a selection of sensor front ends 214 in system 300.

Once a command signal is received by a sensor front end 214, the sensor front end 214 may provide driving voltage V to its respective DPD 216. Each driven DPD 216 may then be placed into active mode as discussed above and output a respective current I to its respective sensor front end 214. Each sensor front end 214 may send a digitized alert signal to MUX 306 indicating that current I has been output to respective sensor front end(s) 214. MUX 306 may then multiplex each received alert signal and output a multiplexed output signal MUX OUT to TDC 220.

TDC 220 may measure the time at which it receives CMD2_delayed, and treat this time as the time when driving voltage V is provided to each DPD 216, activating DPD 216 (e.g., point (c) of FIG. 1A). TDC 220 may also measure the time at which it receives MUX OUT from DPD 216 (e.g., point (d) of FIG. 1A). TDC 220 may record digital representations of the measured times. TDC 220 may determine the triggering time $T_1$ by calculating the difference between these two measured times. This calculation may utilize the digital representations of the measured times.

Programmable delay generator 212 may vary the amount of time (t) to delay CMD2 for a number of iterations. The number of iterations may be a predetermined number, or a variably calculated number. For each iteration, the same or a different number of the DPDs 216 may be driven. For each iteration, the determined triggering time $T_1$ may be output by TDC 220 to accumulator 308. Once all of the iteration triggering times $T_1$ are accumulated by accumulator 308, they may be sent to exaction algorithm processor 310.

Exaction algorithm processor 310 may determine the time (t) for which a triggering time $T_1$ is minimized with the driven DPDs still forward biased and able to sense the event at pulse (b) shown in FIG. 1A. This determined time (t) equals $T_{light}$. Thereafter, the determined $T_{light}$ may be sent to controller 202, and controller 202 may determine the distance L between the one or more objects in the environment and the DPD 216 using the following equation discussed above:

$$L=(T_{light} \cdot c)/2$$

where L is the distance between the one or more objects in the environment and the DPD 216, $T_{light}$ is as described above, and c is the speed of light.

Processing by TDC 220, accumulator 308 and exaction algorithm processor 310 may be performed by digital signal processing in an all-digital environment. This is advantageous because analog signals may be eliminated or reduced from the processing, and added analog noise may therefore be avoided. Additionally, power consumption may be reduced. Also, by providing an all-digital environment, digital circuits may be utilized rather than analog circuits, and can therefore be scaled down to have smaller footprints and/or take up a smaller area on a chip.

System 300 may provide an efficient way to measure the distance to a point in a scene. Having multiple pixels, provided by the multiple DPDs 216, may provide that a point of interest can be selected for a distance measurement. By providing multiplexing and demultiplexing, circuit size and complexity may be reduced. Additionally, autofocus applications may be provided using system 300.

Controller 202 may communicate with other systems via communication protocol 312. For example, controller 202 may receive commands via communication protocol 312 from other processors to drive light source 210 and DPDs 216. Controller 202 may also send data, such as the calculated distance L, via the communication protocol 312 to one or more systems. Communication protocol 312 may be an Inter-Integrated Circuit (I²C) protocol, or any other type of communication protocol, such as serial peripheral interface (SPI), controller area network (CAN), or RS232, for example.

One or more digital to analog converters (DACs) may generate the voltages V that are used to bias DPDs 216. Alternatively, DAC functionality may be provided by each sensor front end 214, or by controller 202. Alternatively, DACs may be in communication with one or more sensor front end 214. A bandgap reference processor may provide a reference voltage to DACs (or the elements that provide DAC functionality) for use in the voltage calculations. The bandgap reference processor may also provide a reference voltage to TDC 220. Alternatively, TDC 220 may have the reference voltage functionality of the bandgap reference processor built into it.

Figure 4:
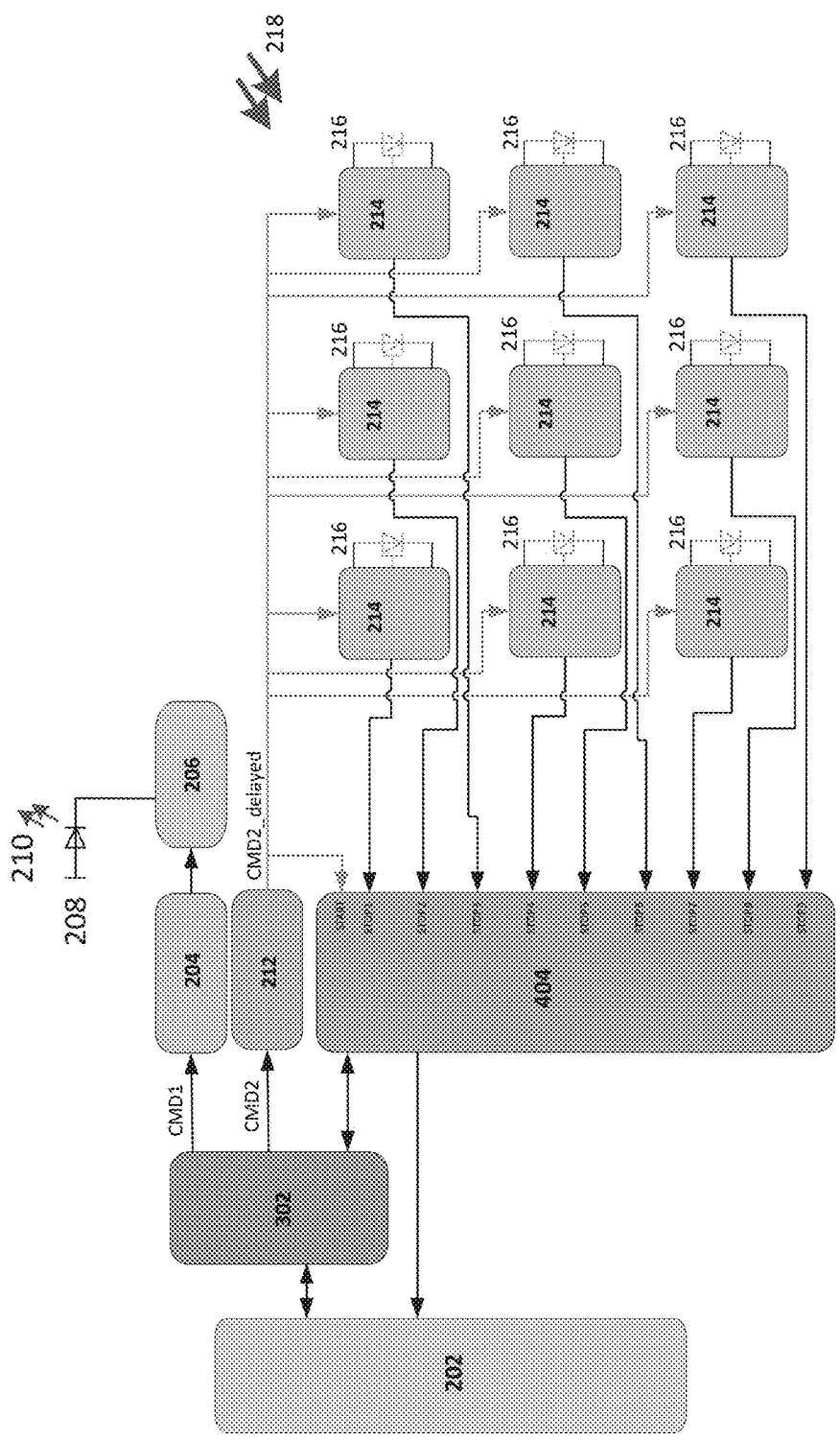
FIG. 4 shows a time of flight system according to an embodiment of the present disclosure where multiple DPDs are included and a parallel operation is used.

FIG. 4 shows a time of flight system 400 according to an embodiment of the present disclosure where multiple DPD are operated by a parallel operation. Elements referred to by the same reference numeral as in FIGS. 2 and 3 function as described in regard to FIGS. 2 and 3.

As previously discussed, signal generator 302 may receive a command from controller 202 to drive light source 208 and activate one or more of the DPDs 216. Signal generator 302 may generate command signal CMD1. CMD1 may be sent to pulse generator 204, which may determine the kind of light pulse that should be emitted by light source 208. Based on this determination, pulse generator 204 may send light pulse parameters to driver 206. As described above, driver 206 may drive light source 208 to output a pulse 210. Pulse 210 may be output and reflect off of one or more objects in an environment to generate incident light 218.

Signal generator 302 may also generate command signal CMD2. CMD2 may specify how each of N number of DPDs 216 in system 400 should function (e.g., the voltage that each DPD 216 should be driven and/or the time at which each DPD 216 should be driven), where N ranges from 1 to as many DPDs 216 are utilized.

At the same time or substantially the same time that CMD1 is sent to pulse generator 204 by signal generator 302, command signal CMD2 may be sent from signal generator 302 to programmable delay generator 212. Programmable delay generator 212 may receive CMD2 and determine the amount of time (t) after light is emitted from light source 208 to delay forwarding CMD2 to sensor front end 214. Programmable delay generator 212 may delay CMD2 by time (t) and output a delayed CMD2 (e.g., CMD2_delayed) to time to digital converter (TDC) 404. CMD2_delayed may also be output to each sensor front end 214 for each DPD 216.

Once CMD2_delayed is received by a sensor front end 214, sensor front end 214 may provide a driving voltage V to its respective DPD 216. Each driven DPD 216 may be placed into the active mode and output a respective current I to its respective sensor front end 214. Each sensor front end 214 may send a digitized alert signal to TDC 404. TDC 404 may measure the time at which it receives CMD2_delayed from programmable delay generator 212, and treat this time as the time when driving voltage V is provided to each DPD 216, activating DPD 216 (e.g., point (c) of FIG. 1A). TDC 404 may also measure the time at which it receives the alert signal from each sensor front end 214 (e.g., point (d) of FIG. 1A). TDC 404 may record digital representations of the measured times. TDC 404 may determine the triggering time $T_1$ by calculating the difference between these two measured times. This calculation may utilize the digital representations of the measured times. TDC 404 may then record a triggering time $T_1$ for each of a number of iterations of time (t) and output a triggering time $T_1$ for each iteration to controller 202.

Programmable delay generator 212 may vary the amount of time (t) to delay CMD2 for each of the number of iterations. As discussed above, the number of iterations may be a predetermined number, or a variably calculated number. For each iteration, the same or a different number of the DPDs 216 may be driven. For each iteration, triggering time $T_1$ may be output to controller 202 by TDC 404. After performing the number of iterations where time (t) is varied, the time (t) for which $T_1$ is minimized with the DPD still forward biased and able to sense the event represented by pulse (b) in FIG. 1A may be determined by controller 202. This determined time (t) equals $T_{light}$. Thereafter, the determined $T_{light}$ may be sent to controller 202, and controller 202 may determine the distance L between the one or more objects in the environment and the DPD 216 using the following equation discussed above:

$$L = (T_{light} \cdot c)/2$$

where L is the distance between the one or more objects in the environment and the DPD 216, $T_{light}$ is as described above, and c is the speed of light.

DACs and bandgap reference processor functionality may be included in FIG. 4 in the same or a similar manner as described in regard to FIG. 3.

FIG. 5A shows an overview 500 of an implementation of a time of flight system according to an embodiment of the present disclosure. A light source 502 may direct a light beam toward a mirror 504. One or more light sources 502 may be included to direct light toward mirror 504. Additionally, multiple mirrors 504 may be included. Mirror 504 may include one or more micromechanical system (MEMS) micro mirror devices. Mirror 504 may redirect the light beam toward an object, such as object 506. Object 506 may be any object, but is shown in FIG. 5A as a vehicle. The light beam may strike object 506 at a point and the light may then be redirected to sensor module 508. Sensor module 508 may include a DPD sensor (such as DPD 216), and accompanying elements such as those described in regard to FIGS. 2-4. Sensor module 508 may determine the distance L between the point on object 506 and sensor module 508. This process can be repeated multiple times to determine a distance between multiple points on object 506 and sensor module 508. By including mirror 504, backlight immunity may be increased, which may provide improved accuracy of measurements and decreased noise in measurements.

FIG. 5B is an exemplary scanning pattern 508 for light source 502. For example, light source 502 may be controlled to direct light in a pattern to multiple points on object 506. In such a case, mirror 504 may be static, and light source 502 may be controlled to direct the light to the multiple points. Alternatively, light source 502 can be static and mirror 504 may be controlled to redirect light to the multiple points. In another embodiment, both light source 502 and mirror 504 can be controlled to redirect light to the multiple points.

Figure 6:
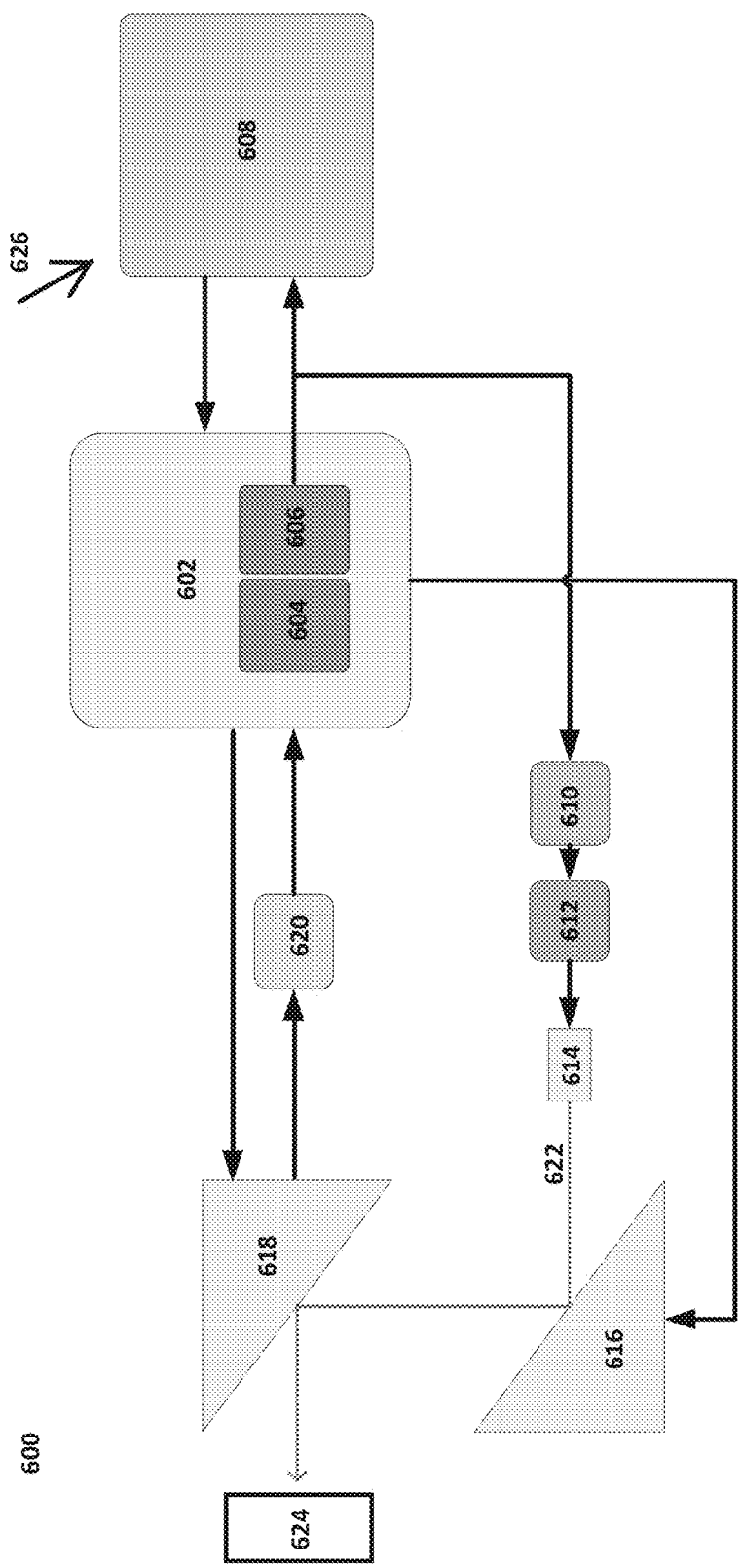
FIG. 6 shows a system for an implementation of a time of flight system according to an embodiment of the present disclosure.

FIG. 6 shows a system for an implementation of a time of flight system according to an embodiment of the present disclosure. In particular, FIG. 6 shows an example control system 600 for the implementation shown in FIG. 5A. Control system 600 may provide synchronization between the sensor array 608 and mirrors 616 and 618. Mirrors 616 and 618 may provide a minimized field of view for directing light from light source 614 toward a point on an object 624. The minimized field of view may eliminate background light and provide an improved measurement of the distance L. The array of FIG. 5B may be used in control system 600.

Controller 602 may be formed by one or more microcontrollers, processors, or microprocessors. Controller 602 may include one or more memory devices such as dynamic random access memory (DRAM), static random access memory (SRAM), flash memory, a magnetic disk drive, an optical drive, a programmable read only memory (PROM), a read only memory (ROM), or any other memory and combination of memories. The one or more microcontrollers, processors, or microprocessors may implement algorithms, instructions, and/or programs that are stored on the one or more of the memory devices in order to perform the various processes of the present disclosure. Controller 602 may send and receive various signals from components in system 600. While FIG. 6 shows various components, it should be understood that the functionality of such components may be embodied in one or more processors that execute instructions which provide such functionality and are stored in one or more memory devices.

Controller 602 may include a counter 604 and/or a lookup table 606. Alternatively, counter 604 and/or a lookup table 606 may be external units that are in communication with controller 602. System 600 may also include sensor array 608. Sensor array 608 may include one or more of the DPDs previously discussed.

In operation, lookup table 606 may communicate with sensor array 608. Lookup table 606 may have entries that correspond to the number of DPDs within sensor array 608. Lookup table 606 may send a command to sensor array 608 that indicates which DPD(s) of the sensor array should be in active mode. Lookup table 606 may also send the command to pulse generator 610. Pulse generator 610 may receive the command from lookup table 606 and may determine the kind of light pulse that should be emitted by light source 614. For example, pulse generator 610 may determine the pulse width and/or pulse magnitude from the command. Based on this determination, pulse generator 610 may send light pulse parameters to driver 612. Driver 612 may then drive light source 614 to output a pulse 622.

Similar to the light source discussed above in regard to FIGS. 2-4, light source 614 may be a laser that emits an infrared (IR) light pulse. Alternatively, light source 614 may be a light source device that emits light other than IR light pulses. For example, light source 614 may be a laser device that emits light pulses featuring wavelengths from parts of the light spectrum other than the infrared wavelength range. Light source 614 may be a light source that is capable of generating short, medium, and long pulses of light. Light source 614 may emit visible or non-visible light.

Pulse 622 may be output and may reflect off of stepper mirror 616 and/or oscillating mirror 618. Both stepper mirror 616 and oscillating mirror 618 may be adjusted in position to redirect light emitted from light source 614. For example, stepper mirror 616 may adjust its position in a horizontal direction, a vertical direction, or in both a vertical direction and a horizontal direction. Similarly, oscillating mirror 618 may adjust its position in a vertical direction, a horizontal direction, or in both a vertical direction and a horizontal direction. One or both of mirrors 616 and 618 may be adjusted in position in order to direct pulse 622 in a specified scanning pattern on an object 624, or toward a specified location on an object 624. Object 624 may be a single object. Alternatively, object 624 may be one or more objects.

Controller 602 may send a control signal to one or both of mirror 616 and 618. For example, controller 602 may send a control signal to stepper mirror 616 and/or oscillating mirror 618 that adjusts mirror positions and thereby redirects light from light source 614 at a specific angle(s). Light 622 may be directed toward object 624 and thereafter reflected. The reflected light is shown in system 600 as light 626, and is incident on sensor array 608.

Oscillating mirror 618 may output a frequency signal to PLL 620. The frequency signal may be a 25 kHz signal, for example, and may indicate the frequency at which oscillating mirror 618 is adjusted in position. PLL 620 detects the frequency. PLL 620 may generate a signal that tracks the indicated frequency of oscillating mirror 618. For example, PLL 620 may send a frequency indicator signal to controller 602 that tracks the frequency of oscillating mirror 618. Controller 602 may receive the frequency indicator signal and may send a control signal to stepper mirror 616 such that stepper mirror 616 is adjusted based on the frequency of oscillating mirror 618. For example, stepper mirror 616 may be adjusted so that it is in sync in its movement relative to oscillating mirror 618. Controller 602 may also send a control signal to oscillating mirror 618 that indicates a new frequency that it should operate, or an adjustment to the frequency that it is operating at. The control of mirror 616 and 618 may provide synchronization between sensor array 608 and each of the mirrors 616 and 618. Moreover, this control may allow for focusing of light pulse 622 onto specific positions and scanning patterns on object 624, and may provide for adjustment of the mirrors to a small field of view when reflected light 626 is incident on sensor array 608. This may eliminate background noise associated with reflected light 626.

Light 626 may be incident on the one or more DPDs of sensor array 608. Sensor array 608 may output a pixel readout signal to controller 602. The pixel readout signal may indicate the amount of reflected light 626 incident on each active DPD. Moreover, the pixel readout signal may be used to determine $T_1$ and Lot. Counter 604 may count the number of $T_1$ values and thereafter determine when a sufficient number have been recorded. Thereafter, $T_{light}$ may be determined by controller 602 based on $T_1$ as discussed above in regard to FIGS. 2-4, and also below in regard to FIG. 7. The distance L can be determined by controller 602 using the equation:

$$L=(T_{light} \cdot c)/2$$

where L is the distance between the one or more objects in the environment and the sensor array 608, $T_{light}$ is as described above, and c is the speed of light.

Figure 7:
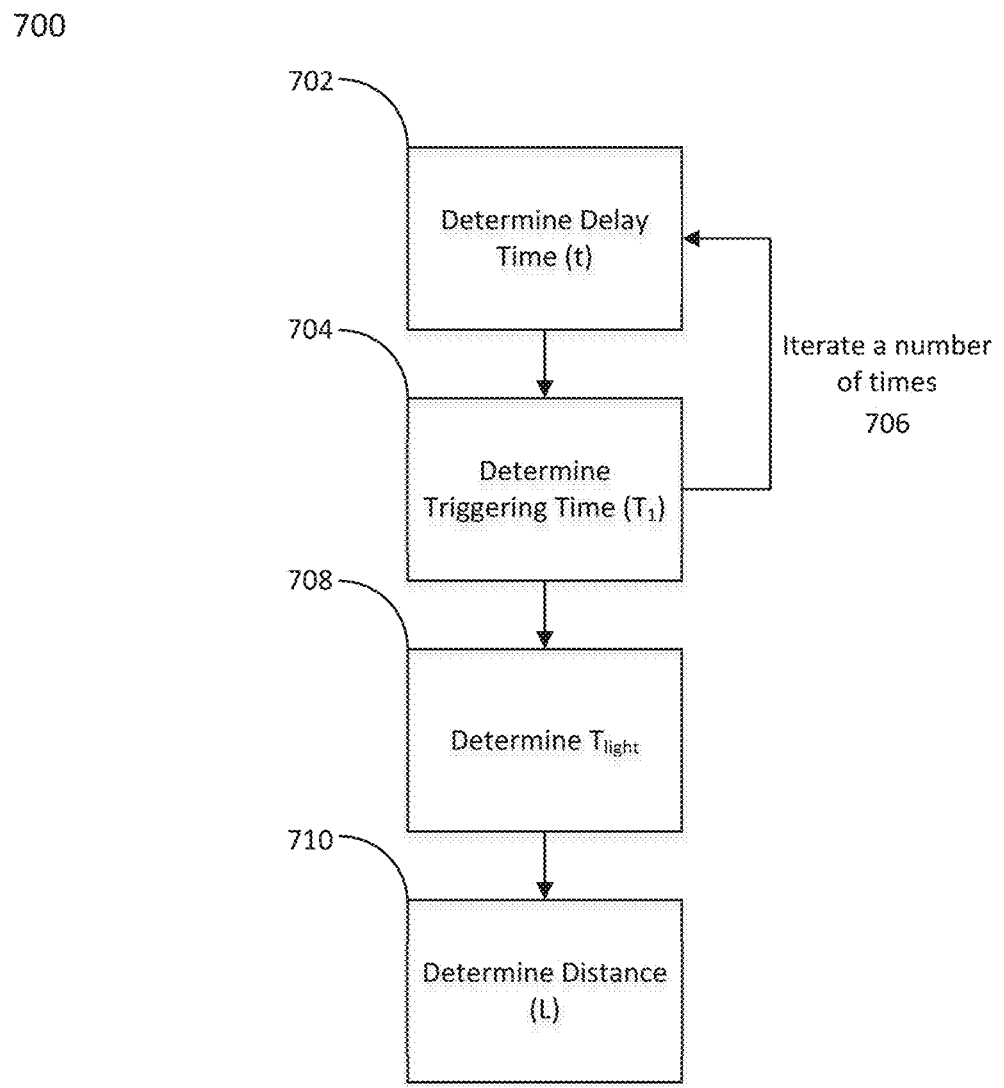
FIG. 7 shows an exemplary flow chart of time of flight processing steps according to an embodiment of the present disclosure.

FIG. 7 shows an exemplary flow chart 700 of time of flight processing steps according to an embodiment of the present disclosure. The steps shown in flow chart 700 may be used by the systems shown in FIGS. 2-4, 5A, and 6.

As shown at step 702, a delay time (t) is determined. The time (t) is the time from when light is emitted by a light source to the time when a driving voltage V is applied to a DPD, such as DPD 216, to place the DPD into an active mode. After the time (t), the DPD is able to sense light that is reflected from one or more objects in an environment and incident on its light sensing region. The reflected light is caused by the light emitted by the light source. At step 704, a triggering time ($T_1$) may be determined. $T_1$ is the time from when the driving voltage V places the DPD into the active mode to when the DPD provides output current I indicating an amount of reflected light from one or more objects sensed by the DPD.

Steps 702 and 704 may be iterated a number of different times as discussed above, and shown by step 706. Steps 702 and 704 may be iterated once (e.g., perform steps 702 and 704 once) or iterated multiple times. When there are multiple iterations, the determined time (t) in step 702 may be varied in each iteration. For example, each time (t) may be increased, decreased, or kept the same for each iteration. Once the required number of iterations of steps 702 and 704 are performed, the process 700 proceeds to step 708.

In step 708, the triggering time $T_1$ of each iteration is analyzed to determine the lowest $T_1$ value for which the DPD is still forward biased and able to sense incident light. The determined time corresponds to a value $T_{light}$. $T_{light}$ is therefore determined.

In step 710, $T_{light}$ is used to determine the distance L between the one or more objects in the environment and the DPD using the following equation discussed above:

$$L = (T_{light} \cdot c)/2$$

where L is the distance between the one or more objects in the environment and the DPD, $T_{light}$ is as described above, and c is the speed of light.

At this point it should be noted that time of flight measurements in accordance with the present disclosure as described above may involve the processing of input data and the generation of output data to some extent. This input data processing and output data generation may be implemented in hardware or software. For example, specific electronic components may be employed in a hardware controller or similar or related circuitry for implementing the functions associated with time of flight measurements in accordance with the present disclosure as described above. Alternatively, one or more processors operating in accordance with instructions may implement the functions associated with time of flight measurement in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A measurement system comprising:
a time to digital converter (TDC) configured to determine a first digitized time for a first signal and a second digitized time for a second signal,
wherein the first signal is delayed by a delay time from a third signal that causes a light source to emit light,
wherein the first digitized time and the second digitized time are determined for N number of iterations of the light source emitting light, and
wherein the delay time is varied for each of the N number of iterations; and
a first dynamic photodiode (DPD) configured to switch from a reverse bias mode to an active mode based on the first signal, wherein the first DPD is further configured to output an output current when subjected to light in the active mode, and
wherein the second signal is based on the output current;
wherein the PDC calculates a difference between the first digitized time and the second digitized time for each of the N number of iterations, and wherein the difference varies as the delay time is varied.

2. The system of claim 1, wherein the measurement system further comprises a controller configured to determine the delay time for the iteration where the difference between the first digitized time and second digitized time is minimized.

3. The system of claim 2, wherein the controller determines a measurement based on the delay time for the iteration where the difference between the first digitized time and second digitized time is minimized.

4. The measurement system of claim 3, wherein the measurement is a distance measurement.

5. The measurement system of claim 4, wherein the distance measurement is determined by calculating $L=(T_{light} \cdot c)/2$, wherein L is the distance measurement, $T_{light}$ is the delay time for which the difference between the first digitized time and second digitized time is minimized, and c is speed of light.

6. The measurement system of claim 1, wherein the first signal is a multiplexed signal comprising a first command signal and a second command signal, and wherein the first command signal corresponds to the first DPD and the second command signal corresponds to a second DPD.

7. The measurement system of claim 6, wherein the first signal is demultiplexed and the first command signal is sent to the first DPD and the second command signal is sent to the second DPD.

8. The measurement system of claim 1, wherein the second signal is a multiplexed signal comprising a first alert signal and a second alert signal, wherein the first alert signal corresponds to the first DPD and the second alert signal corresponds to the second DPD.

9. The measurement system of claim 1, wherein the first signal specifies a driving voltage that is required to switch the first DPD from the reverse bias mode to the active mode.

10. The measurement system of claim 1, wherein the first signal specifies a first driving voltage that is required to switch the first DPD from the reverse bias mode to the active mode and a second driving voltage that is required to switch a second DPD from a second reverse bias mode to a second active mode.

11. A measurement system comprising:
a processor; and
a memory storing instructions executable by the processor, the instructions comprising:
determining a first time from when light is emitted by a light source to when a driving voltage is applied to a dynamic photodiode (DPD), wherein the driving voltage forward biases the DPD;
determining a second time from when the driving voltage is applied to the DPD to when the DPD outputs an output current, wherein the output current indicates incident light that is sensed by the DPD when it is forward biased;
determining the first time and determining the second time for N number of iterations of the light source emitting light, where N is greater than one, and where the first time is varied for each iteration;
determining a minimized second time that is the smallest of all of the determined second times;
determining the first time that corresponds to the minimized second time; and
determining a distance based on the first time that corresponds to the minimized second time.

12. The measurement system of claim 11, wherein the measurement is a distance measurement.

13. The measurement system of claim 12, wherein the distance measurement is determined by calculating $L=(T_{light} \cdot c)/2$, wherein L is the distance measurement, $T_{light}$ is the first time that corresponds to the minimized second time, and c is speed of light.

14. The measurement system of claim 11, wherein the first time is varied for each iteration by increasing the first time in each iteration.

15. The measurement system of claim 11, wherein the number of iterations is a predetermined number.

16. The measurement system of claim 11, the instructions further comprising:
   determining a first control signal configured to control an oscillating mirror in a first direction.

17. The measurement system of claim 16, the instructions further comprising:
   determining a second control signal configured to control a stepper mirror in a second direction.

18. The measurement system of claim 17, wherein the first control signal and the second control signal are configured to synchronize movement of the oscillating mirror with the stepper mirror.

19. The measurement system of claim 17, wherein the first direction is a vertical direction and the second direction is a horizontal direction.

20. The measurement system of claim 17, wherein the first direction is a horizontal direction and the second direction is a vertical direction.

* * * * *

UNITED STATES PATENT AND TRADEMARK OFFICE
CERTIFICATE OF CORRECTION

PATENT NO. : 10,509,113 B2
APPLICATION NO. : 15/481784
DATED : December 17, 2019
INVENTOR(S) : Denis Sallin et al.

Page 1 of 1

It is certified that error appears in the above-identified patent and that said Letters Patent is hereby corrected as shown below:

At Column 13, Claim number 1, Line number 66 should read:
wherein the TDC calculates a difference between the Signed and Sealed this
Seventh Day of April, 2020

Andrei Iancu
*Director of the United States Patent and Trademark Office*